W. A. SELTMANN.
EVAPORATING APPARATUS.
APPLICATION FILED NOV. 29, 1912.
1,079,669.
Patented Nov. 25, 1913.
2 SHEETS—SHEET 1.
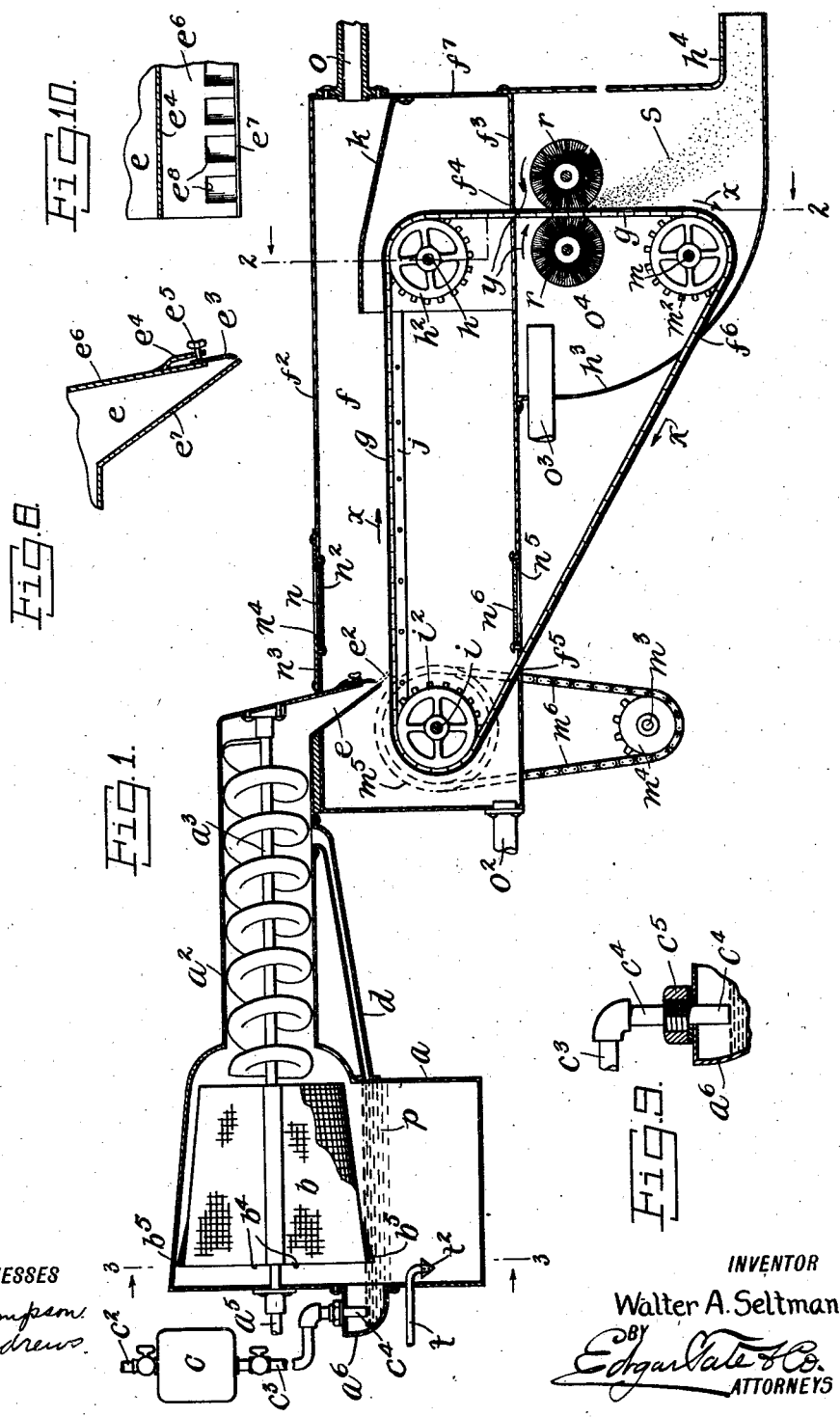
WITNESSES
H. L. Thompson
S. Andrews
INVENTOR
Walter A. Seltmann,
BY
Edgar Tate & Co.
ATTORNEYS.

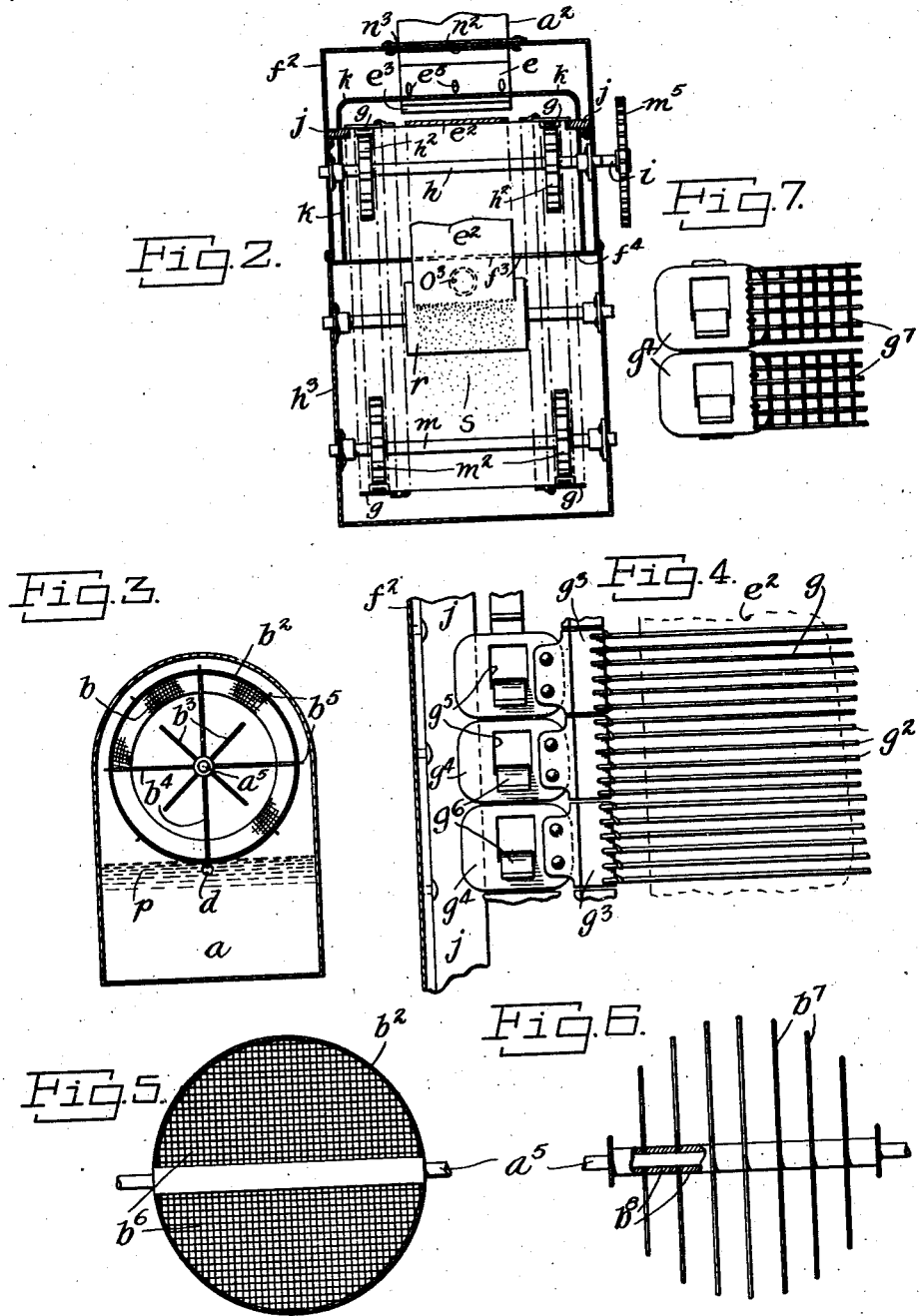

UNITED STATES PATENT OFFICE.

WALTER A. SELTMANN, OF NEW ROCHELLE, NEW YORK.

EVAPORATING APPARATUS.

1,079,669.  Specification of Letters Patent.  Patented Nov. 25, 1913.

Application filed November 29, 1912. Serial No. 733,946.

*To all whom it may concern:*

Be it known that I, WALTER A. SELTMANN, a citizen of the United States, and residing at New Rochelle, in the county of Westchester and State of New York, have invented certain new and useful Improvements in Evaporating Apparatus, of which the following is a specification, such as will enable those skilled in the art to which it appertains to make and use the same.

This invention relates to evaporating apparatus or machines and particularly to machines of this class designed for making powdered, finely divided or crystalline extracts, and the object thereof is to provide an improved machine of this class particularly designed for making vegetable extracts in the production of food products, but which may also be used for making chemical or mineral extracts for medicinal or other purposes, and with these and other objects in view the invention consists in a machine or apparatus of the class specified constructed as hereinafter described and claimed.

The invention is fully disclosed in the following specification of which the accompanying drawing forms a part, in which the separate parts of my invention are designated by suitable reference characters in each of the views, and in which—

Figure 1 is a longitudinal central vertical section of a machine involving my invention;—Fig. 2 a transverse vertical section on the line 2—2 of Fig. 1;—Fig. 3 a similar section on the line 3—3 of Fig. 1;—Fig. 4 a detail plan view on an enlarged scale of an endless conveyer which I employ, and which is shown in Fig. 1;—Fig. 5 a longitudinal sectional view of a modified form of stirrer or mixer which I employ;—Fig. 6 a side view showing another form of a stirrer or mixer which I may employ, with part of the construction in section;—Fig. 7 a view similar to Fig. 4, but showing a modification;—Fig. 8 a view similar to Fig. 1, but showing, on an enlarged scale, a paste discharge nozzle, shown in said figure;—Fig. 9 a sectional detail view of a part of the construction shown in Fig. 1, and;—Fig. 10 a view showing a modification of the construction shown in Fig. 8.

In the practice of my invention, as shown in the drawing, I provide a main liquid extract tank $a$ with the top portion of which is connected a conveyer casing $a^2$ which is cylindrical in cross section and which is in communication with said tank, and in which is mounted a screw conveyer $a^3$ the shaft of which passes through the top portion of the main tank $a$ and is provided within said tank with a stirrer or mixer $b$ which, in the form of construction shown in Figs. 1 and 3, consists of a tapered wire mesh or open work casing $b^2$ provided with central radial blades $b^3$ supported by radial arms $b^4$. The larger end of the stirrer or mixer $b$ is directed forwardly and is provided with radial and tapered wings or blades $b^5$ which may also be made of wire mesh or any other suitable material.

The shaft of the conveyer $a^3$ projects at $a^5$ and may be turned by any suitable power, and mounted outside of the main tank $a$ and supported in any suitable way is a receiver tank $c$ having a supply pipe $c^2$ and a discharge pipe $c^3$, and the outer end of the main tank $a$ is provided with an extension $a^6$ through the top of which the end $c^4$ of the pipe $c^3$ passes, and said end $c^4$ of the pipe $c^3$ is provided with a set nut $c^5$ whereby said end $c^4$ of the pipe $c^3$ may be adjusted vertically so as to limit the extent to which it is passed into the extension $a^6$ of the main tank $a$.

A pipe $d$ forms a communication with the bottom of the front end portion of the conveyer casing $a^2$ and with the main tank $a$ at a point below said conveyer casing, and said conveyer casing is provided at its front end with a downwardly directed discharge nozzle $e$ which extends into a heating chamber $f$ formed by a box-shaped casing $f^2$, and the nozzle $e$, in the form of construction shown in Figs. 1 and 8, is adapted to discharge a thin sheet $e^2$ of material in the form of a paste onto an endless belt conveyer $g$ which operates in the casing $f^2$, which is preferably oblong in form.

The discharge of the nozzle $e$ is provided with a plate $e^3$ whereby the thickness of the sheet $e^2$ of paste material discharged from said nozzle may be regulated, and the front wall of the nozzle $e$ is provided with a support $e^4$ through which is passed a set screw or screws $e^5$ which bear on the plate $e^3$ and hold it in any desired position of adjustment.

Within the heating box or casing $f^2$ and near the front and rear ends thereof are mounted shafts $h$ and $i$ provided with sprocket wheels $h^2$ and $i^2$ on which is mounted an endless belt conveyer $g$, and the shaft $h$ and sprocket wheels $h^2$ and the conveyer $g$, where it passes around said sprocket wheels, are inclosed by a guard or casing $k$ which opens in the direction of the central portion of the chamber $f$. That front end portion of the heating box or casing $f^2$ is provided at the bottom thereof with a downwardly directed extension $h^3$ having a bottom discharge chute $h^4$, and in the bottom part of which is mounted a shaft $m$ having sprocket wheels $m^2$, and the downwardly directed extension $h^3$ of the box or casing $f^2$ is separated from said box or casing by the bottom $f^3$ thereof which is provided with an aperture $f^4$ through which the conveyer $g$ passes and said conveyer also passes around the sprocket wheels $m^2$ on the shaft $m$ and through the bottom of the box or casing $f^2$ at $f^5$ and also through the casing $h^3$ at $f^6$.

Below the end portion of the box or casing $f^2$ in which the shaft $i$ is mounted is a drive shaft $m^3$ having a sprocket wheel $m^4$, and the shaft $i$ is provided with a corresponding sprocket wheel $m^5$ and a drive chain $m^6$ is mounted on the sprocket wheels $m^4$ and $m^5$.

In the top part of the box or casing $f$ and adjacent to the discharge nozzle $e$ is an aperture or opening $n$ closed by a transparent panel $n^2$, and said top part of the box or casing $f^2$ is provided with a removable plate $n^3$ having a corresponding opening $n^4$, and the plate $n^3$ may be removed or detached so as to permit of the insertion of the nozzle $e$ into the said box or casing. The bottom of the box or casing $f^2$ is provided at $n^5$ with an aperture or opening which corresponds with the aperture or opening $n$ and which is closed by a transparent plate $n^6$.

In practice, hot air or other heating medium is introduced through the end $f^7$ of the box or casing $f^2$ into the chamber $f$ through a pipe $o$, and the opposite end of said box or casing is provided with a discharge pipe $o^2$ to which may be applied a suction fan or similar device, if desired, to cause a circulation of the heating medium through the chamber $f$, and the downwardly directed extension $h$ of the box or casing $f^2$ is provided with an inlet pipe $o^3$ for admitting cold air into the chamber $o^4$, formed by the downwardly directed extension $h^3$ of said box or casing. The endless belt conveyer $g$ may consist of transverse rods $g^2$, as shown in Fig. 4, connected in series with plates $g^3$ secured to link members $g^4$ having central apertures $g^5$ and which operate in connection with the sprocket wheels $i^2$, $h^2$ and $m^2$, and the link members $g^4$ are each provided with tongues $g^6$ which are passed through the central apertures $g^5$ in the adjacent link members and bind said link members together, said tongues being in the form of hooks, but my invention is not limited to any exact construction for the conveyer $g$, all that is necessary being to provide an endless belt device of this class the body portion of which is composed of open work material, and said body portion of the endless belt conveyer $g$ may consist of wire mesh, as shown at $g^7$ in Fig. 7, and said wire mesh may be connected directly with the link members $g^4$. I have also shown in Figs. 5 and 6 modified forms of the mixer and stirrer $b$, and in Fig. 5 the casing $b^2$ is provided with radial partitions or blades $b^6$ of wire mesh or any other suitable material, while in Fig. 6 the mixer or stirrer is composed of parallel blades $b^7$ secured to and equally spaced on the shaft $a^3$, preferably by means of collars $b^8$. In the form of construction shown in Fig. 5, the casing $b^2$ of the mixer or stirrer may be cylindrical in form or tapered, as shown in Figs. 1 and 3, or of any other desired shape, but in the form of construction shown in Fig. 6 the diameter of the blades $b^7$ taper or decrease in both directions from the center of the mixer or stirrer. My invention however, is not limited to any of these details of the construction of the mixer or stirrer $b$ and any suitable device of this class may be employed, and instead of discharging the paste from the nozzle $e$ in a single thin sheet, said nozzle may be so formed as to discharge said paste in a plurality of narrow thin strips, as shown in Fig. 10, in which the front plate $e^6$ of the nozzle $e$ is extended down and bears on the back plate $e^7$ of said nozzle and is provided with rectangular apertures $e^8$ through which the paste passes in narrow strips, and with this construction the thickness of said strips of paste will be regulated by the plate $e^3$. I also preferably provide the tank $a$ with an air supply pipe $t$, and said pipe is provided within said tank with a spring head nozzle $t^2$, and in practice, air is forced through said pipe into said tank, and this facilitates the operation of the mixer and stirrer $b$ in forming the thin paste from the liquid contents of said tank. The endless belt conveyer $g$ is provided between the two shafts $h$ and $i$ with horizontal side supports $j$ which are secured to the side walls of the box or casing $f^2$, in the form of construction shown, but these supports are not absolutely necessary and may or may not be employed.

In the use of this apparatus for making finely divided, granulated or crystalline extracts of any kind, a liquid extract is first produced in the usual or any preferred manner, this extract being of a consistency similar to that of thin cream or thin molasses. This extract is fed into the receiver $c$ through the pipe $c^2$ and through the pipe $c^3$ into the part $a^6$ of the main tank $a$ from which it flows into said tank, and the construction is preferably such that the liquid $p$ cannot rise in the main tank $a$ above the open end of the part $c^4$ of the part $c^3$, which permits it to rise so that the stirrer, mixer or agitator $b$ will engage it as the shaft $a^3$ is turned. In the revolution of the stirrer or mixer $b$, the liquid extract in the main tank $a$ is beat up into a paste which is fed into the casing $a^2$ by said stirrer or mixer, the form and construction of which facilitates this operation and passed through the casing $a^2$ by the screw conveyer of which said shaft forms a part, and from the conveyer casing $a^2$ the paste is forced through the nozzle $e$ in the form of a thin strip $e^2$, as hereinbefore described, onto the conveyer $g$ which moves in the direction of the arrows $x$. During this operation, hot air or other suitable heating medium is forced through the pipe $o$ into the chamber $f$ and as the conveyer $g$ passes through the box or casing $f^2$ the paste sheet or strip $e^2$ which lies on said conveyer is thoroughly dried, and the operation of drying and hardening the said paste is facilitated by air passed through the pipe $o^3$ into the chamber $o^4$ as the endless belt conveyer moves downwardly through said chamber, and as the said endless conveyer $g$ passes between the shafts $h$ and $m$ the dried paste thereon is broken up and brushed off by means of rotary brushes $r$ preferably mounted on the opposite sides of the said endless belt conveyer, as shown in Fig. 1, and the finely divided product $s$ constitutes the powdered, finely divided or crystalline extract which falls into the bottom of the casing $h^3$ and is discharged through the spout or nozzle $h^4$ into a suitable receptacle or container provided therefor, and this product is put up in cans, bottles, or other suitable packages in the usual manner.

The object of providing the apertures $n$ and $n^5$ in the top and bottom of the box or casing $f^2$ and closing said apertures or openings by transparent panels is to provide means whereby when a lamp or other source of light is placed beneath the box or casing $f^2$, the operator may look downwardly through the panel $n$ and see the interior of said box or casing and the endless belt $g$ and determine whether or not the apparatus is operating properly, it being understood that the interior of the said box or casing will be illuminated by the lamp or light through the panel $m^6$. The object of the pipe $d$ which forms a communication between the conveyer casing $a^2$ and the tank $a$ is to provide means whereby any watery or thin liquid substance in the bottom of the conveyer casing will be conveyed back into said tank.

It will be understood that the box or casing $f^2$ may be of any desired length as may also the endless belt conveyer $g$, and while I have shown and described the preferred form of my improved apparatus for making powdered, finely divided or crystalline extracts, it will be understood that various changes therein and modifications thereof may be made, within the scope of the appended claims, without departing from the spirit of my invention or sacrificing its advantages.

A finely divided, granulated, or crystalline extract made in the manner described, if a food extract, may be used in the same manner as other extracts of chemicals or minerals may also be produced in the same way and used in a manner similar to other extracts of their class.

In the above operation, the brushes $r$ are driven in the direction of the arrows $y$ by any suitable means and said brushes may, if desired, be geared in connection with the shaft $m^3$, or with either of the shafts $h$ and $m$.

Having fully described my invention, what I claim as new and desire to secure by Letters Patent is:—

1. In an evaporating apparatus, an oblong heating box or casing in which is mounted an endless conveyer, a main tank provided with a conveyer casing which communicates with the top portion thereof, a screw conveyer mounted in said conveyer casing and provided with a shaft which also passes through the top portion of said tank and is provided therein with a stirrer or mixer, said conveyer casing being provided at the end thereof opposite said tank with a downwardly directed discharge nozzle which extends into said box or casing and terminates in proximity to said endless conveyer, and a brush or brushes mounted in connection with said endless belt conveyer after it passes through said heating box or casing.

2. In an evaporating apparatus, a main oblong heating box or casing provided at the bottom of one end with a supplemental casing, an openwork endless belt conveyer movable longitudinally and centrally in the main box or casing and vertically in the supplemental casing, and a brush or brushes mounted in connection with said endless belt conveyer in the supplemental casing, and means for depositing material through the top of the opposite end portion of the main box or casing on said endless belt conveyer.

3. In an evaporating apparatus, a main tank provided with a conveyer casing, a screw conveyer mounted in said casing and the shaft of which passes through the top portion of said tank, a stirrer or mixer connected with said shaft within said tank, and means for feeding liquid material into said tank, said conveyer casing being provided with a discharge nozzle through which the contents of the tank are discharged in the form of a paste, and means for drying said paste and for dividing the same into a powdered, granulated, or crystalline product.

4. In an evaporating apparatus, a tank and means for feeding a liquid substance thereinto, said tank being provided with a conveyer casing which projects therefrom, a screw conveyer mounted in said casing and the shaft of which passes through the top portion of said tank, and a stirrer or mixer connected with said shaft within said tank, the conveyer casing being provided at the end thereof opposite said tank with a discharge nozzle from which the contents of the tank are discharged in the form of a paste, and means for drying said paste and dividing it into a powdered, granulated or crystalline product.

In testimony that I claim the foregoing as my invention I have signed my name in presence of the subscribing witnesses this 26th day of November 1912.

WALTER A. SELTMANN.

Witnesses:
  C. MULREANY,
  S. ANDREWS.